United States Patent [19]

Zane et al.

[11] Patent Number: 4,730,470
[45] Date of Patent: Mar. 15, 1988

[54] SECURITY LOCK

[75] Inventors: Peter L. Zane, Southeastern; Michael S. Zane; Ernest Zane, both of Brookline, all of Mass.

[73] Assignee: KBL Corp., Boston, Mass.

[21] Appl. No.: 903,980

[22] Filed: Sep. 5, 1986

[51] Int. Cl.$^4$ .............................................. E05B 65/12
[52] U.S. Cl. ........................................ 70/238; 70/199; 70/211; 70/216; 70/416; 70/41
[58] Field of Search ................... 70/197, 199, 202-204, 70/210, 211, 215, 216, 238, 416, 41

[56] References Cited

U.S. PATENT DOCUMENTS

| | | | |
|---|---|---|---|
| 1,124,882 | 1/1915 | Flickinger | 70/203 |
| 1,193,679 | 8/1916 | Fox | 70/199 |
| 1,362,377 | 12/1920 | Weidner | 70/203 |
| 1,364,539 | 1/1921 | Baker et al. | 70/199 |
| 1,366,992 | 2/1921 | Winchell | 70/202 |
| 1,494,717 | 5/1924 | Sell | 70/203 |
| 1,547,430 | 7/1925 | McDonald | 70/202 |
| 1,547,976 | 7/1925 | Tiller | 70/199 |
| 1,602,258 | 10/1926 | Smith et al. | 70/199 |
| 1,709,839 | 4/1929 | Chittenden et al. | |
| 2,716,336 | 8/1955 | Ross | 70/238 |
| 2,969,993 | 1/1961 | Jasper | 70/203 |
| 3,190,090 | 6/1965 | Zaidener | 70/203 |
| 3,245,239 | 4/1966 | Zaidener | 70/202 |
| 3,435,646 | 4/1969 | Michnoff | 70/203 |
| 3,550,409 | 9/1968 | Pariser | 70/203 |
| 3,664,164 | 5/1972 | Zaidener | 70/202 |
| 3,690,131 | 9/1972 | Davis | 70/203 |
| 4,196,602 | 4/1980 | Akselsen | 70/211 |
| 4,362,035 | 12/1982 | Vitale | 70/416 X |
| 4,432,432 | 2/1984 | Martin | 70/238 |
| 4,545,224 | 10/1985 | Zane | 70/39 |

FOREIGN PATENT DOCUMENTS

| | | | |
|---|---|---|---|
| 807760 | 7/1951 | Fed. Rep. of Germany | 70/199 |
| 609750 | 8/1926 | France | 70/202 |
| 925217 | 8/1947 | France | 70/199 |
| 865204 | 4/1961 | United Kingdom | 70/199 |
| 1131583 | 10/1968 | United Kingdom | 70/202 |
| 850440 | 8/1981 | U.S.S.R. | 70/199 |

Primary Examiner—Robert L. Wolfe
Assistant Examiner—Suzanne L. Dino
Attorney, Agent, or Firm—Morse, Altman & Dacey

[57] ABSTRACT

An improved security lock for automobiles and the like and of the type designed to lock a control pedal and the steering wheel together is disclosed. The security lock includes a telescopic part featuring an improved length adjustment for speed and strength and the use of a friction device; protective outer member mounted for free rotation about one end of the telescopic part housing the lock cylinder to guard against forceful breaking of the telescopic part and against gaining access to the lock cylinder; and an improved shackle to fit about the steering wheel and being pivotally anchored in the telescopic part.

8 Claims, 6 Drawing Figures

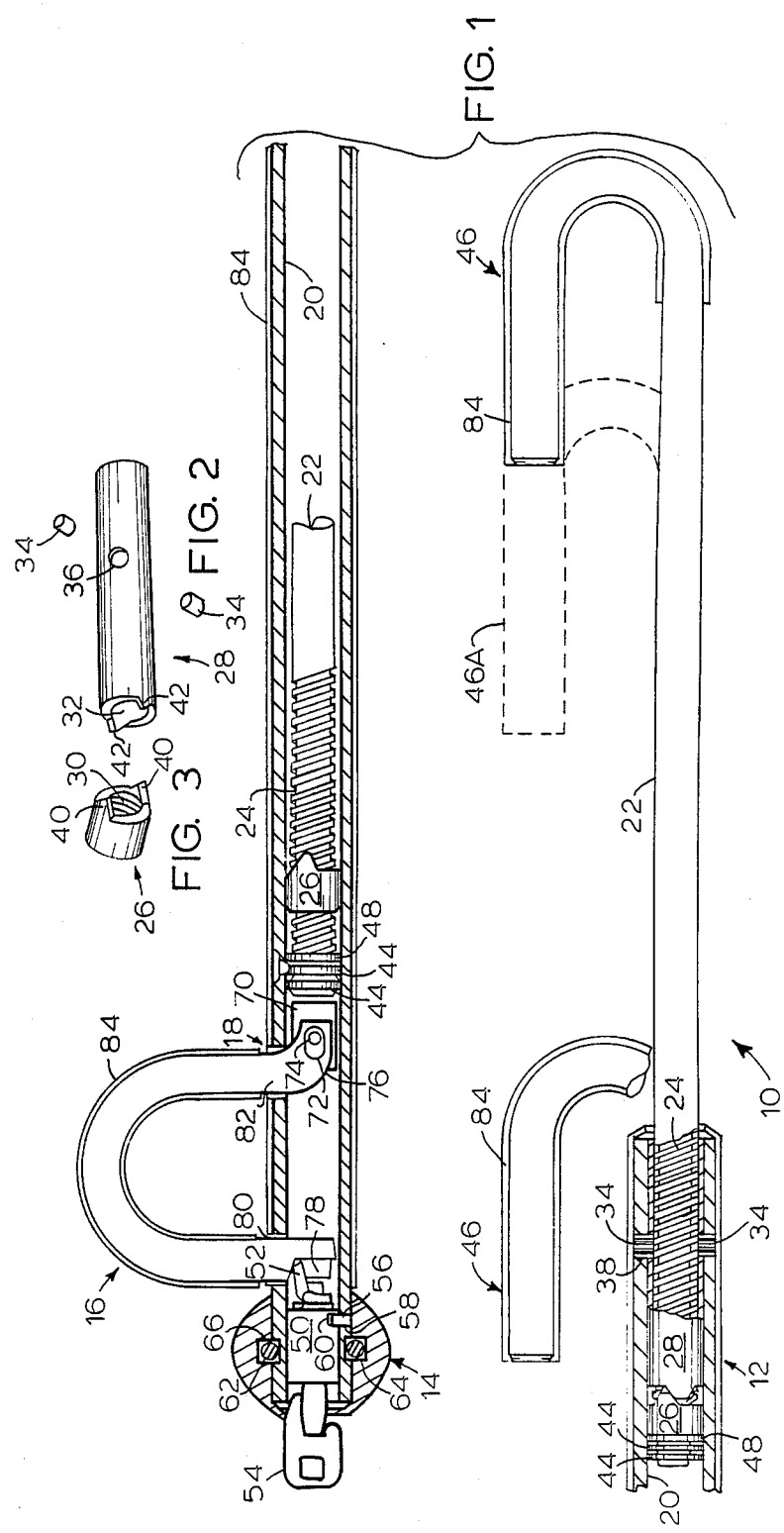

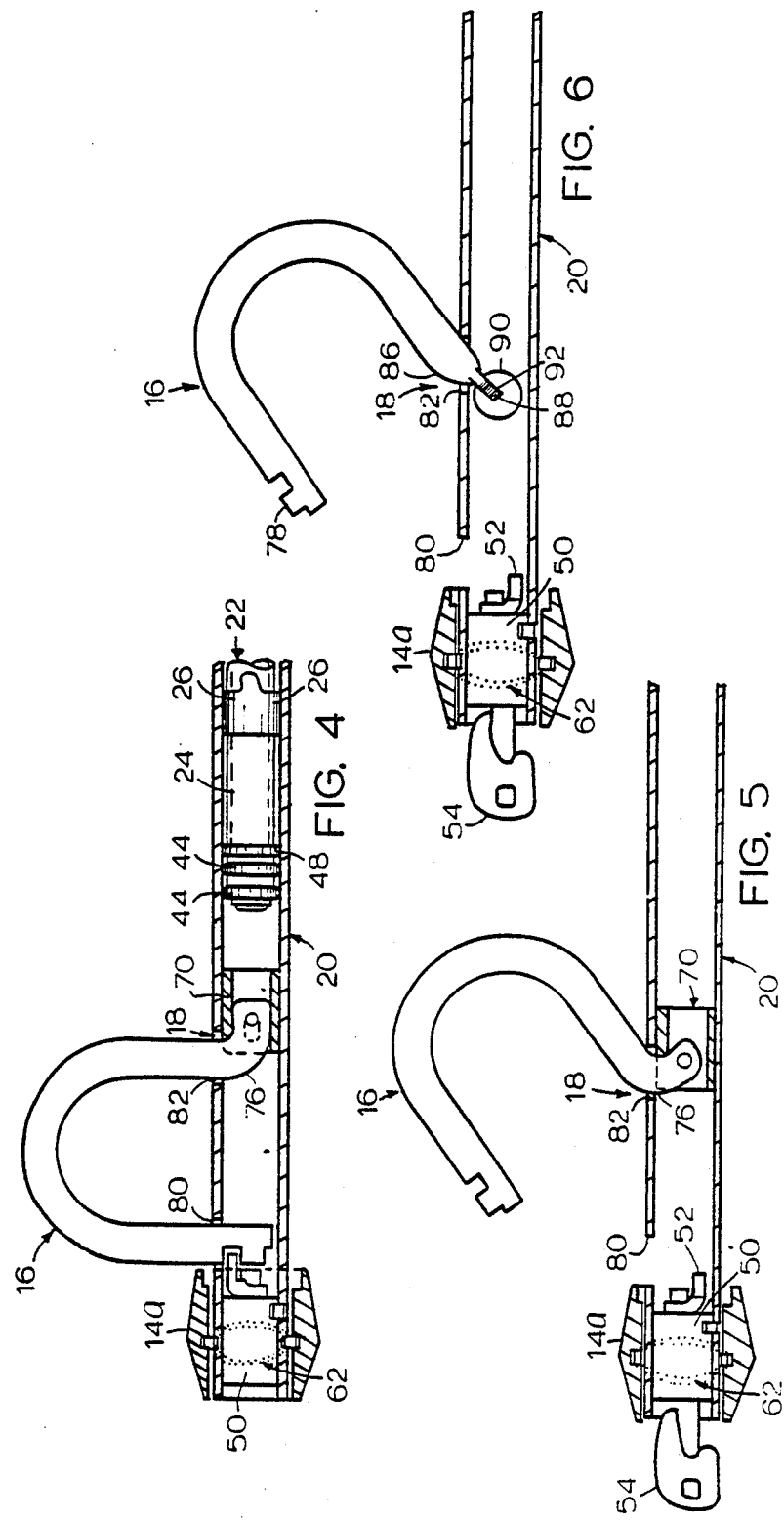

SECURITY LOCK

BACKGROUND OF THE INVENTION

1. Field of the Invention

The present invention relates generally to security locks and, more particularly, to a security lock for automobiles and the like of the type designed to lock the steering wheel and one of the foot control pedals together to prevent unauthorized use and/or theft thereof.

2. The Prior Art

The known prior art is replete with security locks for use as anti-theft devices on road vehicles, such as automobiles, tractors and the like. Some of them go back to the early days of motoring, see U.S. Pat. Nos. 1,193,679 and 1,709,839. As time went on, these devices became more sophisticated and some even cumbersome. Note, U.S. Pat. Nos. 2,716,336 and 3,190,090. Modern day anti-theft devices are illustrated in U.S. Pat. Nos. 3,245,239; 3,550,409; 3,664,164 and 3,690,131. Although for the most part, these devices have served their intended purposes well, some could be rendered ineffective by the application of brute force. A more recent device overcomes this aspect by using a standard automotive vehicle bumper jack, together with a padlock, see U.S. Pat. No. 4,432,432. Its operative use appears most cumbersome, however. In the same category falls a device designed for locking the controls of an aircraft. See U.S. Pat. No. 3,898,823. There is thus plenty of room left for improvements.

SUMMARY OF THE INVENTION

It is a principal object of the present invention to overcome the above disadvantages by providing an improved security lock for automobiles and the like and of the type designed to lock a control pedal and the vehicle steering wheel together.

More specifically, it is an object of the present invention to provide an improved security lock for automobiles and the like comprising a telescopic part featuring an improved length adjustment for speed and strength and including the use of a friction device; a protective outer member mounted for free rotation about one end of the telescopic part housing the lock cylinder to guard against forceful breaking of the telescopic part and against gaining access to the lock cylinder; and an improved hinged shackle, of a type similar to that disclosed in U.S. Pat. No. 4,545,224 and assigned to the same asignee as the instant application, and intended to fit about the vehicle steering wheel and featuring an improved design for anchoring one leg of the shackle to the telescopic part so as to facilitate, inter alia, the opening and closing of the hinged shackle. Preferably, the telescopic part and the shackle are made of a strong metal, such as steel. Preferably, the telescopic part and the shackle are enclosed with a protective skin, both for appearance and also to protect the interior of the vehicle against scratching.

Other objects of the present invention will in part be obvious and will in part appear hereinafter.

The invention accordingly comprises the security lock of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein:

FIG. 1 is a longitudinal section, partly in elevation, of a security lock for automobiles and the like constructed in accordance with the present invention;

FIG. 2 is a perspective view of one operative part of the security lock shown in FIG. 1;

FIG. 3 is a perspective view of another operative part of the security lock shown in FIG. 1;

FIG. 4 is a view similar to FIG. 1 but showing only a portion thereof and with a different shape for one part of the security lock;

FIG. 5 is a view similar to FIG. 4 but showing an operative part of the security lock in an open position; and FIG. 6 is a view similar to FIG. 5 but showing a different anchoring for the operative part of FIG. 5.

DETAILED DESCRIPTION OF THE PREFERRED EMBODIMENT

In general, the illustrated embodiment in FIG. 1 of an improved automobile security lock 10 essentially comprises a telescopic part 12, a protective outer member 14 designed rotatably to fit about one end of the telescopic part 12, and a hinged shackle 16 mounted in and to the telescopic part 12 in a novel manner, as at 18. The shackle's 16 mounting represents a material departure from that disclosed in U.S. Pat. No. 4,545,224, assigned to a common assignee. The differences will be highlighted below.

With automobile prices soaring and automobile thefts not abating, there remains a need for a strong, burglar-proof device that is nevertheless simple to use by the average car owner. It is to fill this need for which the security lock of the present invention has been designed.

The telescopic part 12 of the automobile security lock 10 comprises a tubular member 20, preferably made of steel, and a longitudinal member 22, also preferably made of steel and, designed to be telescopically received within the tubular member 20. The longitudinal member 22, preferably formed as a solid rod, has two operative positions within and with respect to the tubular member 20: (1) an inoperative position in which the longitudinal member 22 is fully collapsed within and into the tubular member 20; and (2) an operative position in which the longitudinal member 22 is fully extended from the tubular member 20. Both of these operative positions are illustrated in FIG. 1. In the upper half of FIG. 1, the longitudinal member 22 is illustrated in its inoperative, fully collapsed position within and into the tubular member 20, while in the lower half of FIG. 1, the longitudinal member 22 is illustrated in its operative, fully extended position from the tubular member 20.

A front segment of the longitudinal member 22 extending into the tubular member 20 is provided with an externally threaded portion 24, which preferably has a coarser than usual thread, i.e., with greater pitch, such as an ACME thread. The threaded portion 24 is, consequently, fast acting and exhibits greater strength due to its broader teeth. It is thus designed for strength and quick length adjustment, as will be evident from below. As will be noted from the illustration in the lower half of FIG. 1, this externally threaded portion 24 preferably, though not necessarily, stays within, i.e., it does not extend from, the tubular member 20.

The adjustment of the longitudinal member 22 between its two operative positions is effected with the aid of a stop nut 26 and a stop bushing 28, respectively illustrated in perspective in FIGS. 2 and 3. As may be observed in FIGS. 2 and 3, the stop nut 26 is internally threaded, as at 30, to mesh with the externally threaded portion 24, on which it is designed to ride. In contrast, the stop bushing 28 features a smooth interior surface 32 of such dimension that the longitudinal member 22, including its externally threaded portion 24, is free to move therethrough in translation. The stop bushing 28 is fixedly mounted in the distal end of the tubular member 20 by a pair of pins 34. The pins 34 are designed to fit tightly into holes 36 and 38, respectively formed in the stop bushing 28 and the wall of the tubular member 20. With the pins 34 in place, flush with the respective walls of the stop bushing 28 and of the tubular member 20, the stop bushing 28 is securely anchored within the tubular member 20.

Both the stop nut 26 and the stop bushing 28 are respectively provided with at least one or more teeth 40 and 42. These teeth 40 and 42 are designed to engage with one another, and combine to arrest the longitudinal member 22 in its fully extended operative position, as illustrated in the lower half of FIG. 1. As may be observed, in this illustrated operative position, the location of the stop nut 26 on the externally threaded portion 24 is on its extreme left, i.e., the stop nut 26 is but separated from a friction device in the form of one of a pair of "O" rings 44 by a suitable spacer 48, giving the security lock 10 its longest extension. In order to accomodate the security lock 10 to differing vehicle dimensions between foot pedal and steering wheel, a length adjustment is built into the security lock 10. This length adjustment is preferably between about three to about five inches, and is determined by the length of the externally-threaded portion 24.

The length adjustment for the automobile security lock 10 represents a one-time adjustment for the particular vehicle and is effected as follows. By turning the tubular member 20 about and with respect to the longitudinal member 22, the relative axial position of the stop nut 26 on the externally threaded portion 24 is changed from that of being on the extreme left and abutting the spacer 48, to a position away from, i.e., to the right, of the "O" rings 44, as illustrated in the upper half of FIG. 1. Since the stop bushing 28 is fixedly mounted in the end of the tubular member 20, the fully extended operative position for the longitudinal member 22 will now be shorter and achieved sooner since the teeth 40 of the stop nut 26 will engage the teeth 42 of the stop bushing 28 sooner than in the position illustrated in the lower half of FIG. 1.

In order to facilitate the translatory motion of the longitudinal member 22 within the tubular member 20 and, more specifically, to keep such translatory motion concentric with respect to the surrounding tubular member 20, the friction device in the form of one or more "O" rings 44 preferably is provided at the end of the externally threaded portion 24. The friction device in the form of the "O" rings 44 combines with the stop bushing 28 to facilitate the angular orientation of the longitudinal member 22 within and with respect to the tubular member 20 as well as to achieve a certain degree of concentric alignment of the longitudinal member 22 within the tubular member 20. The "O" rings 44 also render smoother the translatory motion of the longitudinal member 22 within the tubular member 20. Preferably, these "O" rings 44 are made of of hard rubber or plastic such as nylon, teflon and the like.

The free end of the longitudinal member 22, the end designed to be received or hooked about one of the control foot pedals of the vehicle, for the most part the brake pedal, is formed with a hook 46. It is to orient the relative angular position of the hook 46 with respect to the tubular member 20, more specifically to the location of the shackle 16 thereon, that the above-mentioned angular orientation pertains as effected with the aid of the friction device in the form of the "O" rings 44. This friction device also helps to prevent the longitudinal member 22 from freely extending itself from the tubular member 20. Rather, the friction device requires that the user pull on the hook 46, albeit not strenuously, so as to extend the longitudinal member 22 from the tubular member 20.

In FIG. 1, the hook 46 also is illustrated in its two operative positions: an inoperative position, with the longitudinal member 22 being fully collapsed within the tubular member 20 and, an operative position, with the longitudinal member 22 being fully extended therefrom. An intermediate position for the hook 46 is illustrated in phantom lines 46a.

In the near end of the tubular member 20 is mounted a lock cylinder 50 provided with a cam 52 and operable with a round key 54. The lock cylinder 50 is anchored in and to the tubular member 20 with a pin 56. The pin 56 is designed to enter through a hole 58 formed in the member 20, and into a depression 60 formed in the wall of the lock cylinder 50. The cam 52 also has two operative positions, with the locked position being illustrated in FIG. 1. It is pointed out that the key 54 can only be inserted into or removed from the lock cylinder 50 when the cam 52 is in its illustrated locked position.

The protective outer member 14 is mounted for free rotation about the near end of the tubular member 20 with the aid of a snap ring 62. The snap ring 62, preferably made of steel, is designed to snap into place within respective cooperative annular channels 64 and 66, respectively formed in the tubular member 20 and the protective outer member 14. The protective outer member 14 essentially serves two functions. First, by overlying the location of the anchoring pin 56 for the lock cylinder 50, it prevents access thereto and the consequent unauthorized removal of the lock cylinder 50 from the automobile security lock 10, rendering it useless for its intended purpose. Second, the ball-shaped protective outer member 14 prevents a pipe from being fitted, by a prospective thief, over the free near end of the tubular member 20 and intended to bend and/or break the same in the vicinity of the shackle 16. Further, the free rotation of the protective outer member 14 makes access to it with theft tools more difficult, such as when one is attempting to break the lock 10 with a wrench.

The shackle's 16 mounting in end to the tubular member 20 is an improvement over that disclosed in U.S. Pat. No. 4,545,224, assigned to a common assignee. There a bicycle lock is disclosed comprising a cross bar and a U-shaped shackle. The U-shaped shackle is formed with a pair of legs, with one of the legs terminating in a bent end or foot.

The shackle's 16 improved hinge-like mounting herein, as at 18, to the tubular member 20 serves three functions. First, the hinge-like mounting 18 securely and permanently anchors the leg with the bent end 76 in and to the tubular member 20. This is unlike the structure disclosed in said U.S. Pat. No. 4,545,224 where the shackle can always be separated from the cross bar in the unlocked position. Second, the hinge-like mounting 10 of the shackle 16 facilitates the opening and closing of the shackle 16 so that a user has an easier time in securing the shackle 16 about the vehicle steering wheel. And thirdly, the hinge-like mounting 18 of the shackle 16 allows for the greatest amount of articulation therein by permitting the shackle 16 to open as wide as possible, as illustrated in FIGS. 5 and 6, and thereby facilitating the shackle's 16 use even on trucks and tractors provided with wider rimmed steering wheels.

One preferred way of effecting the hinge-like mounting 18 is by the provision of a sliding hinge 70 to mount the bent end 76 of one of the pair of legs in and to the tubular member 20, as illustrated in FIGS. 1, 4 and 5. Another preferred way of effecting the hinge-like mounting 18 is by the provision of a ball member 90, as illustrated in FIG. 6.

The sliding hinge 70 is formed with an oblong slot 72. A pin 74, mounted to the bent end 76 of the shackle 16, secures the same in and to the sliding hinge 70 by riding within the oblong slot 72. The sliding hinge 70 is designed slidingly to fit within the tubular member 20. The other leg of the shackle 16 is formed with a protrusion 78. The cam 52 of the cam lock 50 is designed to fit about the protrusion 78, so as to secure the shackle 16 in and to the tubular member 20. The two legs of the shackle 16 are designed to enter into the tubular member 20 via respective holes 80 and 82, one 80 of which is circular in cross section, while the other 82 is oval. Preferably, a protective covering skin 84 is designed to envelope the tubular member 20, the shackle 16, and the hook 46, to protect the vehicle interior against scratching when the security lock 10 is applied or removed.

The automobile security lock illustrated in FIGS. 4 and 5 is essentially the same as shown in and described with reference to FIG. 1, except that the cross sectional configuration of the protective outer member 14a is angular as opposed to being ball-shaped as is the member 14. Further, the FIGS. 4 and 5 intend to illustrate the operation of the shackle 16, with the former showing the locked position and the latter showing the open position. The longitudinal member 22 is only shown in FIG. 4 but not in FIG. 5. Also, the protective outer skin 84, which preferably is made of plastic or rubber, is omitted from the drawings of FIGS. 4 and 5.

The second preferred way of effecting the hinge-like mounting 18 of the shackle 16 is illustrated in FIG. 6. In this mode, there is no sliding hinge. Rather, the ball member 90 itself is provided to give the shackle 16 this hinge-like anchoring in and to the tubular member 20, as well as to provide for the wide and easy opening of the shackle 16. Further, the shackle's 16 leg 86 herein need not feature a bent end, as in the previous embodiment. The leg 86 is formed, instead, with an externally threaded stud 88 designed to fit within an internally threaded hole 92 radially formed within the ball 90.

Thus, it has been shown and described an improved automobile security lock 10 of the type designed to lock a control pedal and the vehicle steering wheel together, which security lock 10 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A security lock for automobiles and the like comprising:
   (a) a tubular member designed to receive a longitudinal member telescopically therein, one end of said longitudinal member provided with an externally threaded portion;
   (b) a stop bushing mounted in said tubular member and designed to fit about said longitudinal member, and an internally threaded stop nut designed to ride about said externally threaded portion of said longitudinal member, both said stop bushing and said stop nut provided with at least one tooth designed to engage one another;
   (c) a U-shaped shackle having a pair of legs and hingelike mounted in one end of said tubular member;
   (d) a lock cylinder secured in said one end of said tubular member;
   (e) a hinge member slidingly disposed within said tubular member, and a pin operatively coupling said one of said pair of legs to said hinge member; and
   (f) a protective outer member secured about and enveloping said one end of said tubular member and in a location surrounding said lock cylinder, said protective outer member having a diameter exceeding the diameter of said tubular member.

2. The security lock of claim 1 further provided with a friction device mounted about said one end of said longitudinal member and designed to engage said tubular member, and wherein said hinge like mounting of said U-shaped shackle is effected with a ball member disposed within said tubular member.

3. In a security lock for automobiles and the like of the type designed to lock the steering wheel and one of the foot control pedals thereof together and including a pair of members one of which is telescopically receivable within the other and is provided at its free end with a hook for said foot control pedal, the improvement comprising:
   (a) said one of said pair of members provided with an externally threaded portion;
   (b) a stop bushing received in one end of said second of said pair of members and about said externally threaded portion of said one of said pair of members;
   (c) a stop nut, said stop nut being internally threaded and meshing with said externally threaded portion;
   (d) said stop bushing and said stop nut each being provided with at least one tooth, designed cooperatively to engage one another;
   (e) a friction device secured about the free end of said one of said pair of members adjacent said externally threaded portion;
   (f) a U-shaped shackle having a pair of legs, one of said pair of legs being pivotably anchored within said second of said pair of members; and
   (g) a member slidingly disposed within said second of said pair of members and a pin operatively connecting said sliding member to said one of said pair of legs of said U-shaped shackle.

4. The security lock of claim 3 further including a cam lock mounted in the end of said second of said pair of members and designed to lock the second of said pair of legs of said U-shaped shackle to said second of said pair of members.

5. The security lock of claim 4 further including a protective outer member mounted about and enveloping said end of said second of said pair of members rotatably about the longitudinal axis of said members, said protective outer member having a diameter exceeding the diameters of said pair of members, and further including means for rotatably securing said protective outer member to and about said end of said second of said pair of members.

6. The security lock of claim 5 further including a pin insertable radially through said second of said pair of members and designed to secure said cam lock within said tubular member, and wherein said cam lock is provided with a cam designed to engage a depression formed in said second of said pair of legs of said U-shaped shackle, said cam being operable by a key between a depression-engaging locked position and a depression-non-engaging open position.

7. The security lock of claim 6 wherein said key has two operative positions: a locking position and a non-locking position, said key being insertable in and removable from said cam lock only in said locking position.

8. The security lock of claim 6 wherein said protective outer member is formed with two flat surfaces, inclined at an angle toward the middle of said member and defining a raised annular rim about said middle.

* * * * *